United States Patent Office 3,374,321
Patented Mar. 19, 1968

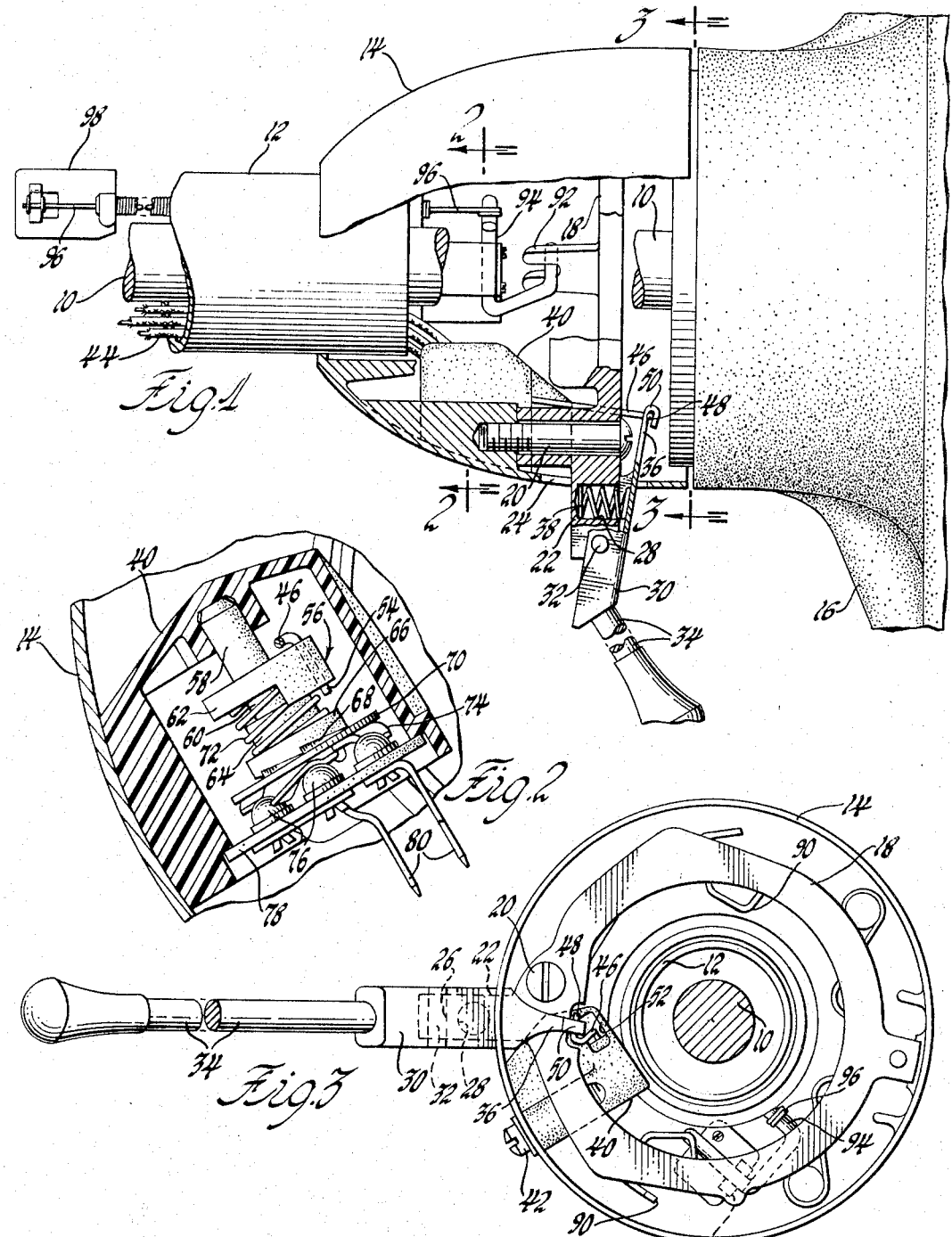

3,374,321
DIRECTION SIGNAL AND DIMMER
SWITCH ACTUATOR
Elmer F. Trarbach, St. Clair Shores, Mich., assignor to General Motors Corporation, Detroit, Mich., a corporation of Delaware
Continuation of application Ser. No. 150,416, Nov. 6, 1961. This application Apr. 22, 1965, Ser. No. 450,156
7 Claims. (Cl. 200—61.27)

This invention relates to a vehicle switch actuator and more particularly to a combination direction signal and headlight dimmer switch actuator. This is a continuation application of Ser. No. 150,416, filed Nov. 6, 1961.

Conventionally, headlight dimmer switches are mounted on the floorboard of a vehicle for operation by the driver's foot. In many instances, however, it is inconvenient to use the foot to perform this operation. Further, in the construction and assembly of vehicles it is sometimes quite difficult to economically provide a means of installing the dimmer switch in the floorboard or to make the necessary electrical connections thereto.

Accordingly, it is the goal of the present invention to overcome these difficulties using a hand operated dimmer switch actuator, and more particularly, a dimmer switch actuator combined with a direction signal actuator so as to improve the ease of operation of a dimmer switch as well as to reduce the number of light actuators which must be placed in a vehicle.

The invention is carried out by providing a conventional direction signal actuator mechanism with a means to permit motion of the operating lever in a direction normal to the usual direction of movement of direction signal operating levers and to utilize this motion to actuate the light dimmer switch. More particularly, the invention contemplates modifying a direction signal switch of the type having a switch actuator mounted on a vehicle steering column and an operating lever extending outwardly therefrom by providing means to permit movement of the operating lever toward the steering wheel and a suitable linkage to transmit such motion of the operating lever through a headlight dimmer switch mounted on the steering column.

The above and other advantages of the invention will be made more apparent from the following specification taken in conjunction with the accompanying drawings wherein like reference numerals refer to like parts, and wherein:

FIGURE 1 is a partly broken away elevation view of a combination turn signal and dimmer switch actuator according to the present invention;

FIGURE 2 is a detailed cross section view of a dimmer switch mechanism taken along lines 2—2 of FIGURE 1; and FIGURE 3 is a plan view of the actuator mechanism as taken along lines 3—3 of FIGURE 1.

The embodiment of the invention to be described is carried out by modifying the direction signal actuator shown in Brown et al. 2,863,013. Reference may be had thereto for certain details not described herein.

FIGURE 1 of the drawings illustrates a steering shaft 10 surrounded by a mast jacket or steering column 12, and enlarged housing or support member 14 secured to the upper end of the mast jacket 12, and a steering wheel 16 mounted on the steering shaft 10 and located above the housing 14. An actuator plate or ring 18 is pivotally fastened within the housing 14 by pivot pin 20. An elongated ear 22 extending outwardly from the actuator ring 18 near the pivoting point thereof and extending through an aperture 24 in the housing 14 is provided with an aperture 26 extending transversely therethrough near its outer end and is further provided with a cavity 28 in the upper surface thereof inwardly of the aperture 26. A channel-shaped bracket 30 is pivotally mounted on the ear 22 by a pin 32 extending through the aperture 26. The outer end of the bracket 30 has an operating lever 34 fixed thereto and has at its inner end a tongue 36 extending through the opening 24 into the housing 14. A coil compression spring 38 within the cavity 28 of the ear 22 bears against the under surface of the bracket 30 to urge the bracket in a clockwise direction as viewed in FIGURE 1 thereby normally holding the lever 34 in a downward position.

A headlight dimmer switch casing 40 is attached inside the housing 14 near the actuator pivot point by screws 42. Electrical conductors 44 lead from the dimmer switch and extend down through the mast jacket 12 for connection with the vehicle headlight circuit. A wire link 46 has one end 48 thereof held by a bent-over portion 50 of the tongue 36. The wire link 46 extends downwardly past the actuator ring 18, through a cavity 52 of the housing of the dimmer switch 40, and terminates in a bent end 54 which engages an aperture in the driver member 56 of the dimmer switch.

As illustrated in FIGURE 2, the preferred embodiment of the dimmer switch comprises a casing 40, a driver 56 having a shaft portion 58 journaled within the housing, a further shaft portion 60, and an intermediate enlarged portion 62 to which the wire 46 is attached. A ratchet wheel 64 is slidably mounted on the shaft portion 60 for rotation therewith. A toothed portion 66 of the ratchet 64 engages coacting teeth 68 on the contact carrier 70. The toothed portions 66 and 68 are yieldably urged into engagement by a coil spring 72 around the ratchet 64 and shaft 60 and acting between the enlarged portion 62 and the toothed portion 66. A multi-fingered contact wheel 74 on the contact carrier 70 selectively engages alternate ones of the contacts 76 which are supported by a back assembly 78 and which are electrically connected to the conductors 44 by terminals 80.

The operation of the dimmer switch is substantially the same as conventional headlight dimmer switches of similar structure. That is, when the wire 46 is pushed downwardly to cause rotation of the driver 56, the ratchet member 64 and the contact carrier 70 with its associated contact wheel 74 are likewise rotated to break the electrical connection with one set of contacts 76 and move into connection with the alternate set of contacts. Then as the wire 46 and the ratchet are lifted to their original positions, the driver 56 and the ratchet member 64 will rotate in the opposite direction, but the contact carrier 70 will remain stationary. As mentioned before, the basic structure of the direction signal actuator mechanism is disclosed in Brown et al. 2,863,013. Certain features such as the pawls 90, however, are described in Barcus 3,073,921. It is sufficient to point out here that the lower surface of the actuator ring 18 has a depending forked portion 92 that engages one arm of a crank mechanism 94. The crank mechanism is pivoted to the housing and its other arm has a looped end of a Bowden wire 96 attached thereto. The Bowden cable extends downwardly through the mast jacket 12 and terminates at a direction signal switch 98 mounted on the mast jacket 12. When the operating lever 34 is moved to either direction signal operating position, the actuator ring 18 pivots about the pin 20 to cause rotation of the crank mechanism 94, movement of the Bowden wire 96, and finally, actuation of the direction signal switch 98 to either right or left turn position.

To actuate the headlight dimmer switch, it is necessary merely for the vehicle operator to manually pull the operating lever 34 toward the steering wheel 16 to rock the bracket 30 about the pin 32 and hence, to move the wire link 46 axially downward. As previously described, this downward movement of the link 46 will cause the dimmer switch to step to a new position. When the operating lever 34 is released the spring 38 will return the lever, the bracket, the wire link, and the dimmer swtich to normal position. Ordinarily the direction signals will be actuated independently of the dimmer switch and vice versa. However, if it is desired, both may be actuated simultaneously by moving the operating lever 34 to one of the direction signal operating positions and at the same time pulling it toward the steering wheel.

Thus it will be readily seen that the present invention provides a convenient means for mounting and assembling a dimmer switch for manual operation and at the same time provides a dimmer switch which need not occupy space on the floorboard of a vehicle and which does not require foot operation.

The embodiment of the invention disclosed herein is for illustrative purposes only and the scope of the invention is intended to be limited only by the following claims.

I claim:

1. A combination direction signal and headlight dimmer switch actuator comprising a housing,
    a direction signal actuator ring pivotally mounted on the housing for movement about a first axis,
    a manually controlled operating lever mounted near one end of the ring moving the ring about the first axis and pivoted to the ring for movement about a second axis transverse to the first axis,
    a direction signal switch connected with the ring for actuation upon pivoting the ring about the first axis,
    a dimmer switch secured to said housing,
    a wire link connected between said one end of the lever and the dimmer switch for actuating the dimmer switch upon movement of the operating lever about the second axis,
    and a spring member acting between the ring and the lever for resiliently biasing the lever in one direction about the second axis.

2. In a motor vehicle having a steering column including a housing at one end thereof,
    a steering wheel axially adjacent said housing,
    a manually operable direction signal switch actuating member pivotally mounted within said housing for movement about a first pivot axis from a neutral position to an operative position on either side of said neutral position,
    detent means for releasably maintaining said member in either a left or right turn indicating position,
    canceling means movable with said steering wheel for returning said member to a neutral position after completion of a turn,
    a headlamp dimmer switch mounted in said housing and including a dimmer switch actuating member,
    said dimmer switch being operable in a recurrent manner between a high beam and a low beam position upon successive actuation of said dimmer switch actuating member,
    an operating member for selectively operating either of said switch actuating members,
    means pivotally mounting said operating member to said direction signal actuating member about a second axis perpendicular to said first axis,
    means coupling said operating member to dimmer switch actuating member.

3. In a motor vehicle having a steering column including a housing at one end thereof, a steering wheel axially adjacent said housing, a manually operable direction signal switch actuating member pivotally mounted within said housing for movement about first pivot axis, detent means for releasably maintaining said member in either a left or right turn indicating position, cancelling means movable with said steering wheel for returning said member to a neutral position after completion of a turn, a headlamp dimmer switch mounted in said housing and including a dimmer switch actuating member, said dimmer switch being operable in a recurrent manner between a high beam and a low beam position upon successive actuation of said dimmer switch actuating member, said direction signal actuating member having a portion thereof extending outside of said housing, said portion including a cavity having a spring mounted therein, an operating member for selectively operating either of said switches, said operating member being pivotally mounted to said portion about an axis perpendicular to said first axis and having a tongue portion in contact with said spring whereby said operating member is normally biased in the first direction about said second axis, additional means connecting said tongue portion to said headlamp dimmer switch actuating member.

4. The combination claimed in claim 3 wherein said additional means comprises a wire link.

5. A combination direction signal and headlight dimmer switch actuating mechanism comprising support means,
    a direction signal switch actuator mounted on said support means for movement about a first axis,
    a manually controlled operating lever joined to the actuator for moving the actuator about the first axis and for movement about a second axis,
    a direction signal switch operable by the actuator upon moving the actuator about the first axis from a neutral position to an operative position on either side of said neutral position,
    a dimmer switch mounted on said support means,
    link means for actuating the dimmer switch upon movement of the operating lever about the second axis, said dimmer switch being movable between a high beam and a low beam position upon successive actuating by said link means,
    means normally, resiliently biasing said link means in one direction about said second axis.

6. A combination direction signal and headlight dimmer switch actuating mechanism comprising support means, a dimmer switch mounted on said support means,
    a direction signal switch actuating member,
    a dimmer switch actuating member, an operating member,
    coupling means coupling said operating member to said direction signal switch actuating member,
    mounting means mounting said direction signal switch actuating member to said support means for movement in a first plane from a neutral position to an operative position on either side of said neutral position,
    said coupling means and said mounting means cooperating to permit movement of said operating member in a second plane,
    said operating member being provided with an integrally formed projecting finger for operating said dimmer switch actuating member upon movement of said operating member in said second plane, said dimmer switch being operable in a recurrent manner between a high beam and a low beam position upon successive operation of said dimmer switch actuating member.

7. Apparatus for selectively or concurrently operating a direction signal switch and a headlamp dimmer switch comprising a housing,
    a direction signal switch actuating member mounted within said housing,
    a manually controlled operating lever joined to said direction signal switch actuating member,
    said direction signal switch being actuated by said direction signal switch actuating member upon movement of said operating lever in a first plane from a neutral position to an operative position on either side of said neutral position, said dimmer switch being mounted within said housing and including dimmer switch actuating means, said dimmer switch being recurrently movable between a high beam and a low beam position upon successive operation of said dimmer switch actuating means, said operating member including an integrally formed extending finger movable in a second plane by said operating member for operating said dimmer switch actuating means.

References Cited

UNITED STATES PATENTS

| 2,935,894 | 5/1960 | Coronado-Arce | 200—153 |
| 3,047,698 | 7/1962 | Walker | 200—153 |

FOREIGN PATENTS

| 448,142 | 5/1949 | Italy. |
| 1,251,136 | 12/1960 | France. |

BERNARD A. GILHEANY, *Primary Examiner.*

GEORGE HARRIS, *Examiner.*

H. A. LEWITTER, *Assistant Examiner.*